United States Patent [19]

Neko

[11] Patent Number: 4,826,640
[45] Date of Patent: May 2, 1989

[54] INJECTION MOLDING MACHINE AND BACK PRESSURE CONTROL METHOD OF THE SAME

[75] Inventor: Noriaki Neko, Hachioji, Japan

[73] Assignee: Fanuc Ltd., Minamitsuru, Japan

[21] Appl. No.: 81,456

[22] PCT Filed: Nov. 19, 1986

[86] PCT No.: PCT/JP86/00593

§ 371 Date: Jul. 9, 1987

§ 102(e) Date: Jul. 9, 1987

[87] PCT Pub. No.: WO87/03243

PCT Pub. Date: Jun. 4, 1987

[30] Foreign Application Priority Data

Nov. 20, 1985 [JP] Japan .................. 60-258593

[51] Int. Cl.$^4$ .................................... B29C 45/77
[52] U.S. Cl. .................... 264/40.3; 264/40.7; 425/145; 425/171
[58] Field of Search .............. 425/145, 150, 171, 149; 264/40.3, 40.5, 40.7

[56] References Cited

U.S. PATENT DOCUMENTS 3,767,339 10/1973 Hunkar .................. 425/145

FOREIGN PATENT DOCUMENTS 174623 9/1985 Japan .
174625 9/1985 Japan .
248717 11/1986 Japan .

Primary Examiner—Jay H. Woo
Assistant Examiner—Timothy W. Heitbrink
Attorney, Agent, or Firm—Staas & Halsey

[57] ABSTRACT

An injection molding machine is provided which uses servo motors (M1, M2) as driving sources and in which a preset back pressure is correctly transmitted to a resin. The torque limit values and rotating directions of an injection servo motor in respective stages is set in accordance with the relationship in magnitude between the preset back pressure and the resistance during a transmission mechanism of the respective stages of metering. A servo circuit of an injection servo motor is torque-limited with a preset torque limit value, and the injection servo motor is driven in a preset rotating direction.

10 Claims, 3 Drawing Sheets

| ROTATION SPEED | TORQUE LIMIT VALUE | SWITCHING POINT | DIRECTION |
|---|---|---|---|
| SC1 | BP1 | SW1 | SGN1 |
| SC2 | BP2 | SW2 | SGN2 |
| ⋮ | ⋮ | ⋮ | ⋮ |
| SCi | BPi | SWi | SGNi |
| ⋮ | ⋮ | ⋮ | ⋮ |
| SCn-1 | BPn-1 | SWn-1 | SGNn-1 |
| SCn | BPn | SWn | SGNn |

INJECTION MOLDING MACHINE AND BACK PRESSURE CONTROL METHOD OF THE SAME

BACKGROUND OF THE INVENTION

The present invention relates to an injection molding machine in which a servo motor for driving an injection mechanism controls a back pressure applied to a molten resin during metering and a back pressure control method of the same. More particularly, the present invention is an injection molding machine which can correctly control the value of the back pressure for a wide range and a back pressure control method of the same.

In the metering process of an injection molding machine, a resin as a molding material is plasticized to a molten state in a heating cylinder by rotation of a screw, and the molten resin is then stocked in the distal end portion of the heating cylinder. The screw is moved backward by the pressure of the molten resin. When the screw is moved backward to a preset metering position, the rotation of the screw is stopped, and the metering process is ended.

Conventionally, in order to adjust the melting and metering effect for the resin, the back pressure is controlled during metering. For example, in an injection molding machine of a type in which an injection mechanism is driven by hydraulic pressure, the back pressure is also controlled by the hydraulic pressure. Recently, in a molding machine of a type in which an injection mechanism is driven by a servo motor, a method has been developed to perform back pressure control by applying a torque limit to the servo motor (refer to Japanese Patent Application No. 60-88911).

In an injection molding machine using a servo motor, the injection servo motor is driven so that the screw is kept at the present position during metering. However, as the screw rotates, the resin pressure is increased to move the screw backward, thereby causing a positional error. In this case, a drive command is output to the servo motor to return the screw to the initial position. However, since the drive current of the servo motor is limited by a torque limit value, corresponding to the preset back pressure, a force exceeding the preset back pressure is not applied to the resin.

In order to apparently eliminate the positional error caused as a result of this, a numerical controller detects the value of an error register, and subtracts the detected value from the error register, thereby setting the register value to zero, in other words, following up the value of the error register. In practice, however, a delay occurs in the time required for the numerical controller to complete follow-up of the value of the error register. Therefore, the screw is moved backward during this delay time. Even if the value of the error register is followed up, the error register is not actually set to zero. As a result, a motor drive current command corresponding to the torque limit value is always output, and the motor output torque is in accordance with the torque limit value. When the screw is moved backward to reach the preset metering position, the rotation of the screw is stopped, thereby completing the metering process.

However, with a conventional servo-type back pressure control system, back pressure control cannot be correctly performed because of the reasons to be described later.

SUMMARY OF THE INVENTION

It is an object of the present invention to provide an injection molding machine which can apply a preset back pressure to a resin and a back pressure control method of the same.

The present invention is based on the recognition that the factors which vary the back pressure in the servo motor-type back pressure control system are in a transmission mechanism between the servo motor and the screw. More specifically, the transmission mechanism of the back pressure control system of this type includes, e.g., a ball screw and nut to convert rotational movement of the servo motor into linear movement of the screw. The above transmission mechanism has a more complex structure than a transmission mechanism of a hydraulic-type control system. The back pressure control transmission mechanism having the above arrangement generates a resistance (to be merely referred to as a frictional force hereinafter) such as a frictional force that acts, when the screw is moved backward by the resin pressure, in a direction to interfere with the backward movement. The generated frictional force varies the back pressure which is typically applied to the resin.

In order to achieve the above object, according to the present invention, an injection molding machine controls by a numerical controller a servo motor for rotating a screw and an injection servo motor for driving the screw in an axial direction through a transmission mechanism, thus performing injection which thereby performs metering. Back pressure control is performed by applying a torque limit to a servo circuit for driving the injection servo motor, wherein a torque limit value of each stage and a rotating direction of the injection servo motor in each stage are set in accordance with a relationship in magnitude between a preset back pressure of the corresponding stage of the metering process and a resistance, including a frictional force, that is generated in the transmission mechanism. The servo circuit of the injection servo motor is torque-limited with the preset torque limited value in each stage, and the injection servo motor is driven in the preset rotating direction.

As described above, according to the present invention, a torque limit, which is obtained by correcting a preset back pressure with a resistance generated by the transmission mechanism between the injection servo motor and the screw, is applied to the injection motor. Thus, the servo motor is driven in such a direction as to move the screw forward or backward in accordance with the relationship in magnitude between the preset back pressure and the resistance of the transmission mechanism. Therefore, the preset back pressure can be correctly applied to the resin.

DETAILED DESCRIPTION OF THE PREFERRED EMBODIMENT

Figure 1:
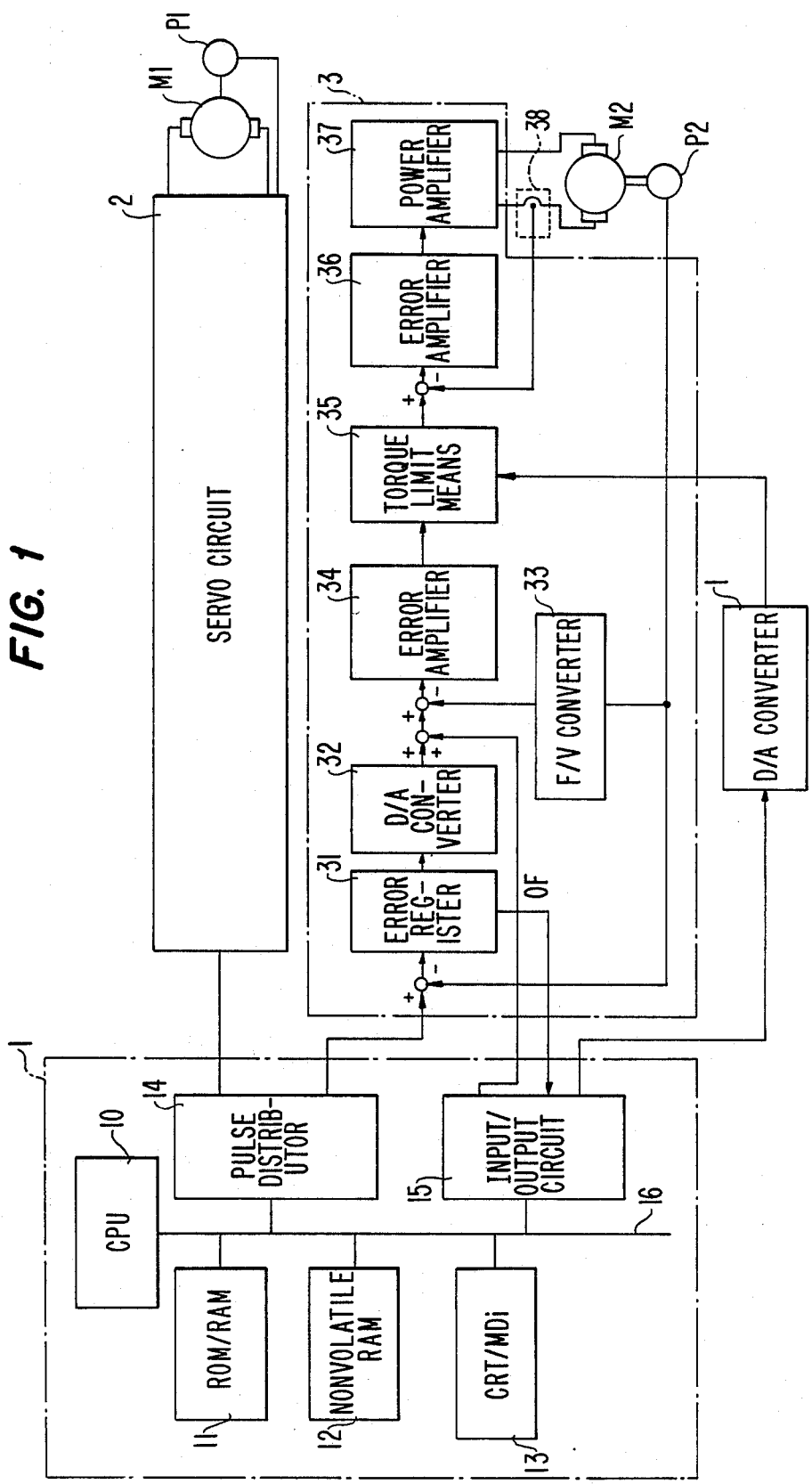
FIG. 1 is a block diagram showing a back pressure control system of an injection molding machine according to an embodiment of the present invention.

FIG. 1 shows a back pressure control system of an injection molding machine according to an embodiment of the present invention. Referring to FIG. 1, reference numeral 1 denotes an operational circuit portion of a numerical controller of the injection molding machine. The circuit portion 1 is connected to a servo circuit 2 for driving a servo motor M1, which rotates a screw (not shown), and to a servo circuit 3 for driving an injection servo motor M2, which drives the screw in an axial direction and supplies a back pressure during injection and metering. The servo motors M1 and M2 are provided with pulse encoders P1 and P2, respectively, for detecting their positions and speeds. A D/A converter 4, for converting a torque limit command supplied from the operational circuit portion 1 into an analog voltage, is also provided.

The operational circuit portion 1 of the numerical controller 1 has a microcomputer 10, a memory 11, a nonvolatile RAM 12, a manual data input unit (to be referred to as a CRT/MDi hereinafter) 13 with a CRT display, a pulse distributor 14, and an input/output circuit 15. These circuit components are connected via a bus 16. The memory 11 includes a ROM for storing a control program for controlling the injection molding machine, a RAM for temporarily storing data, and so on. The nonvolatile RAM 12 stores various preset values to be described later. The pulse distributor 14 drives the servo motors M1 and M2.

The servo circuit 3 has an error register 31 and a D/A converter 32. The error register 31 stores a difference between the movement command supplied from the operational circuit portion 1 and the movement amount of the servo motor M2, supplied from the pulse encoder P2. The D/A converter 32 converts the value of the error register 31 into an analog signal and outputs a velocity command. The servo circuit 3 also includes an F/V converter 33 and an error amplifier 34. The F/V converter 33 converts the signal, representing the present speed of the motor M2 and supplied from the pulse encoder P2, into a voltage. The error amplifier 34 compares a value, obtained by adding the velocity command supplied from the D/A converter 32 to an offset voltage output from the operational circuit portion 1 (through the input/output circuit 15 to be described later), with a voltaage output from the converter 33, and amplifies the difference therebetween. The amplified difference is output as a drive current command, i.e., a torque command, to a torque limit means 35. The means 35 receives the torque limit command output from the input/output circuit 15 of the operational circuit portion 1, through the D/A converter 4, and clamps the output from the error amplifier 34 with a value corresponding to the torque limit command and outputs the clamped value. The servo circuit 3 also has an error amplifier 36 and a power amplifier 37. The error amplifier 36 compares the drive current command output through the error amplifier 34 and the torque limit means 35 with a signal supplied from a current detector 38, for detecting the drive current of the servo motor M2, and amplifies the difference therebetween. The power amplifier 37 is operated by the output from the error amplifier 36.

With the above arrangement, first, the operator sets various conditions for the metering process via the CRT/MDi 13. More specifically, a screw rotation speed SCi, a preset back pressure BSi, and a screw position SWi of a switch point, or a terminal at which switching to the next stage is performed, of the respective stages i (i=1, 2, ...) of the metering process are set in the nonvolatile RAM 12.

Even if the injection servo motor M2 is driven during metering by applying a torque limit with a value corresponding to the preset back pressure BSi, because of the influence of a frictional force R, or the like, of a transmission mechanism (not shown) that transmits the torque of the servo motor M2 to the screw, the force actually applied to the resin is not equal to the preset back pressure. More specifically, the frictional force R acts in a direction to interfere with the backward movement of the screw caused by the resin pressure, and the force actually applied to the resin is a value obtained by adding the frictional force R to the output torque BPi of the injection motor M2, as indicated in following equation (1):

$$\text{Force actually applied to resin} = \text{Output torque BPi}$$
$$\text{of motor M2} + \text{frictional force R} \quad (1)$$

In order to obtain a force applied to the resin equal to the preset back pressure BSi, the output torque BPi of the motor may be set to a value obtained by subtracting the frictional force R from the preset back pressure BSi, as indicated in equation (2):

$$\text{BPi} = \text{force BSi to be applied to resin} - R \quad (2)$$

As is understood from equation (2), when the preset back pressure BSi is larger than the frictional force R, the output torque BPi of the motor M2 is positive. Therefore, the motor may be driven in the forward direction while applying a torque limit, so that the screw is driven in the forward direction. However, when the preset back pressure BSi is smaller than the frictional force R, the output torque BPi of the motor is negative, and the motor M2 must be driven in the reverse direction so as to drive the screw in the backward direction. More specifically, when the prest back pressure BSi is small and the frictional force R is large, in order to set the force actually applied to the resin to the preset back pressure BSi, the servo motor M2 drives the screw in the backward direction and the motor M2 generates an output torque of R−BSi. Then, since the output torque BPi=(R−BSi), of the motor acts in a direction to drive the screw backward, and the frictional force R acts in a direction to interfere with the backward movement of the screw, the composite force of them, i.e., a force actually applied to the resin is equal to the back pressure BSi, as indicated in equation (3) below:

$$\text{Force actually applied to resin} = R - (R - \text{BSi}) = \text{BSi} \quad (3)$$

Therefore, when the servo motor M2 is driven by applying a torque limit to control the back pressure, the drive direction of the servo motor M2 must be considered by taking into account the relationship in magnitude of the preset back pressure and the frictional force R. Some numerical controllers have an offset function to correct the offset voltage of a D/A converter and so forth. This embodiment utilizes this offset function in order to control the drive direction of the injection servo motor M2. For this purpose, when the metering conditions are to be set, the CPU 10 performs the processing shown in FIG. 2 so that the nonvolatile RAM 12 stores the metering conditions as shown in FIG. 3.

Figures 2, 3:
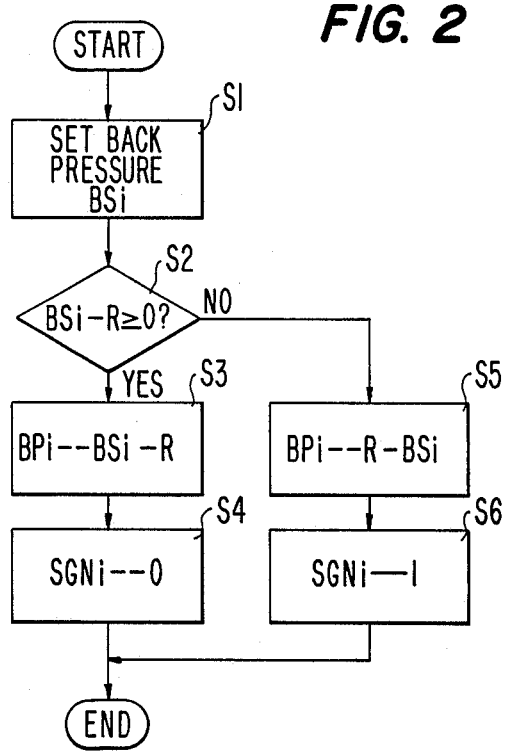
FIG. 2 is a flow chart of a control program for performing processing to set the torque limit value for metering conditions and the rotating direction of an injection servo motor.
FIG. 3 is a table for setting the metering conditions.

When the screw rotation speed SCi and the switching point screw position SWi of the respective stages i in the metering process are set by the CRT/MDi 13, the CPU 10 directly stores the data in the table T of the nonvolatile RAM 12, as shown in FIG. 3. Subsequently, every time each back pressure BSi is set, the CPU 10 performs the processing shown in FIG. 2, and causes the nonvolatile RAM 12 to store the torque limit value BPi (the output torque of the servo motor M2) and the drive direction SGNi of the servo motor M2.

More specifically, when a back pressure BSi is set, the CPU 10 detects the setting (step S1), subtracts the frictional force R of the transmission mechanism of the injection molding machine from the preset back pressure BSi, and determines if the subtraction result is positive or negative (step S2).

If YES in step S2, the preset back pressure BSi is larger than the frictional force R, and the screw is to be driven in the forward direction. The value obtained by subtracting the frictional force R from the preset back pressure BSi is stored in the RAM 12 as a torque limit value BPi which is an output torque of the servo motor M2 (step S3), and the direction (forward) "0" to move the screw forward is stored as a rotating drive direction SGNi of the servo motor M2 (step S4).

If NO in step S2, the preset back pressure BSi is smaller than the frictional force R. Therefore, as described above, a value obtained by subtracting the preset back pressure BSi from the frictional force R is stored as the torque limit value BPi, and the direction (reverse) "1" to move the screw backward is stored as a rotating drive direction SGNi of the servo motor M2 (steps S5 and S6).

In this manner, the screw rotation speed SCi, the torque limit value BPi, the switching screw position SWi, and the driving direction SGNi of the servo motor M2, of the respective stages i of the metering process are preset and stored in the table T of the nonvolatile RAM 12.

In this embodiment, the back pressure BSi is preset. However, the frictional force R can be subtracted in advance from the back pressure BSi, the absolute value of the subtraction result may be set as the torque limit value BPi, and the rotating drive direction SGNi may be manually set.

Figure 4:
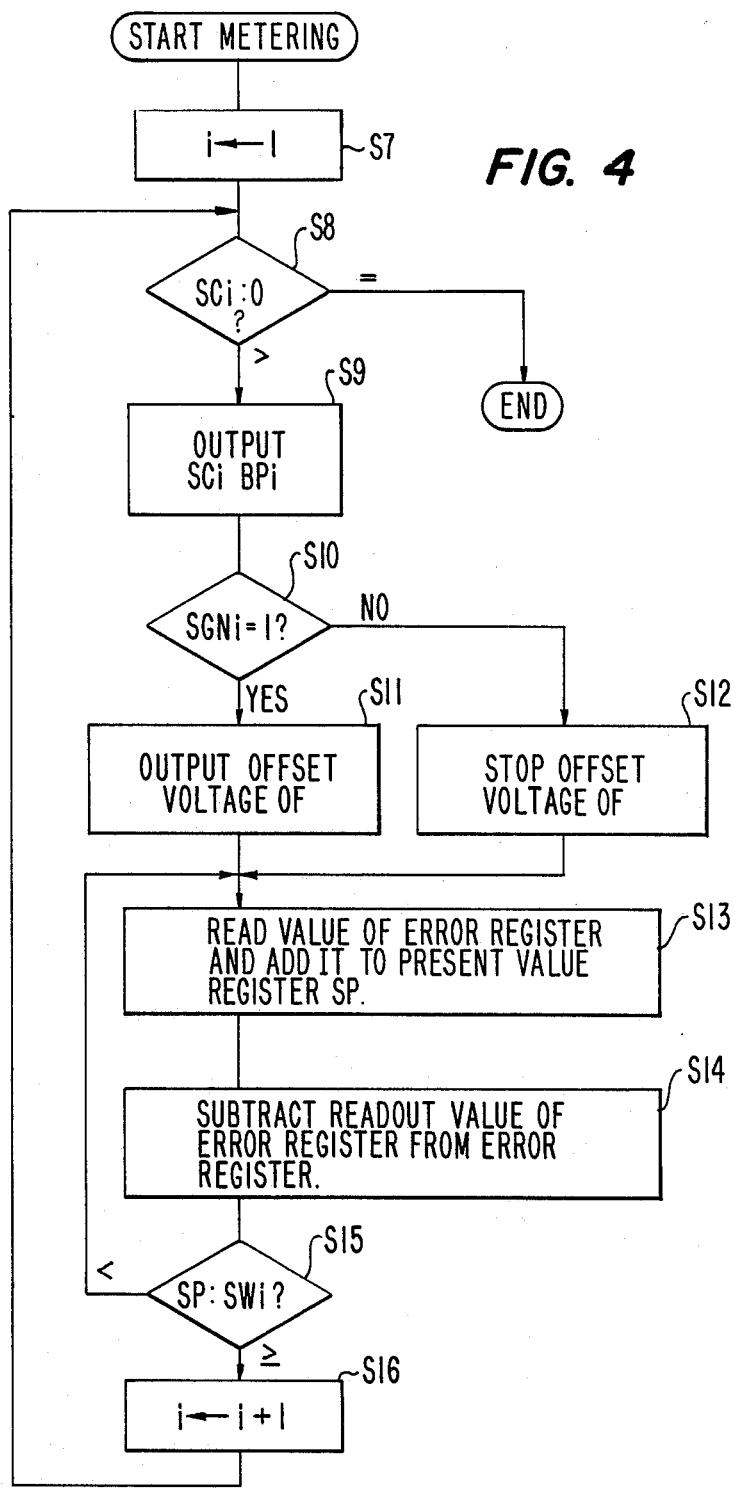
FIG. 4 is an operation processing flow chart for metering.

After the various data are set, when the injection molding machine is actuated to start the metering process, the metering process shown in FIG. 4 is started. The CPU 10 sets a counter i to 1 (step S7), and a screw rotation speed SC1 of the first stage is read out from the table T of the nonvolatile RAM 12. If the data is correctly set, the CPU 10 determines that the screw rotation speed SC1 is not "0" (step S8). The screw rotation speed SC1 read out from the table T is output to the servo circuit 2 of the screw servo motor M1. The servo motor M2 then drives the servo motor M1 with the preset screw rotation speed SC1. The CPU 10 reads the torque limit value BP1 of the first stage from the table T, and BP1 is output to the D/A converter 4 through the input/output circuit 15 (step S9). The torque limit value BP1 is converted into an analog voltage by the converter 4 and is supplied to the torque limit means 35. The means 35 clamps the output of the error amplifier 32 with the torque limit value BP1.

Subsequently, the CPU 10 reads a drive direction SGN1 of the servo motor M2 of the first stage from the table T, and determines if the direction SGN1 is "1" (step S10). If NO in step S10, an offset voltage OF is not output. If YES in step S10, an offset voltage OF is output and added to the output from the D/A converter 32 (steps S11 and S12).

When the direction SGN1 is not "1", that is, when the preset back pressure BS1 is larger than the frictional force R, the offset command OF is not output. In this case, since no movement command has been input to the error register 31, the servo motor M2 remains stopped. Then, when the servo motor M1 is driven, the screw is rotated, the resin is melted, the molten pressure becomes high, and the screw is pushed backward. As a result, the servo motor M2 is rotated in the reverse direction and a pulse train, representing reverse rotation of the servo motor (backward movement of the screw), is output from the pulse encoder P2 of the servo motor M2 and added to the error register 31. The value of the error register 31 is converted into a voltage by the D/A converter 32, amplified by the error amplifier 34, and output to the torque limit means 35. This output is clamped by the torque limit means 35. Therefore, no drive current command (torque command) exceeding the torque limit value BP1 set in the torque limit value 35 is output.

The servo motor M2 is driven by a drive current corresponding to the torque limit value BP1, through the error amplifier 36 and the power amplifier 37, so that the error register 31 becomes "0", i.e., the servo motor M2 is returned to the initial position. As a result, the resin is pressed by the screw with a torque corresponding to the torque limit value BP1, i.e., with the preset back pressure BS1. When the molten pressure of the resin exceeds the preset back pressure BS1, the screw is moved backward because of the differential pressure between the molten resin pressure and the preset back pressure.

Subsequently, the CPU 10 reads the value of the error register 31 through the input/output circuit 15, adds this value to a present value register SP (FIG. 4) for storing the present position of the screw (step S13), inverts the sign of the read value of the error register 31, adds the inverted value to the error register 31, and updates the register (step S14). In this manner, the value of the error register 31 is set to "0" to maintain the servo motor M2, i.e., the screw position, at the present position. The screw is moved backward and the servo motor M2 is rotated in the reverse direction even while the CPU 10 performs this processing. Therefore, the value of the error register never becomes "0".

As a result, a velocity command in a direction to move the screw forward is output from the D/A converter 32, added with the output from the F/V converter 33 (since the motor is rotated in the reverse direction, the output from the F/V converter 33 becomes negative, and addition is performed), amplified by the error amplifier 34, and output.

More specifically, since the drive current comman (torque command) is clamped by the torque limit means 35 with the preset torque limit value BP1, the servo motor M2 is driven in the forward direction with a torque corresponding to the torque limit value. The CPU 10 then determines whether the value of the present value register SP has reached the switch point SW1 from the first to second stage (step S15). If NO in step S15, processing of steps S13 to S15 is repeated. When the value of the present value register SP (i.e., the screw position) reaches the switching screw position SW1, the count i of the counter is incremented by "1" (step S16), and processing following step S8 is performed for the second stage of the metering process.

If YES in step S10, i.e., when the preset back pressure BSi is smaller than the frictional force R, the CPU 10 outputs an offset voltage of a direction (a direction to rotate the motor in the reverse direction) to move the screw backward (step S11). The offset voltage is amplified by the error amplifier 34 and clamped by the torque limit means 35. Then, the drive current command is clamped at the preset torque limit value BPi and the output torque of the servo motor M2 is limited, thereby driving the servo motor M2 in a direction to move the screw backward. Therefore, as indicated in equation (3), the force to be applied to the resin equals the preset back pressure BSi, and processing similar to the steps after step S13 is performed. In this manner, when all stages of the metering process are completed and the screw rotation speed SCi read out from the table T is determined to be SCn, i.e., "0" (step S8), the metering process is completed.

Although certain preferred embodiments have been shown and described, it should be understood that many changes and modifications may be made therein without departing from the scope of the appended claims.

I claim:

1. An injection molding machine including a servo motor for rotating a screw and an injection servo motor for driving the screw in an axial direction through a transmission mechanism and performing injection, the sevo motor and the injection servo motor being driven by servo circuits respectively controlled by a numerical controller for performing multi-stage metering control and a back pressure control, said back pressure control comprising the steps of:
   (a) setting a torque limit value for each of the metering stages and a rotating direction of the injection servo motor for each of the metering stages in accordance with a relationship in magnitude between a preset back pressure for an associated one of the metering stages and a value representative of mechanical energy loss;
   (b) applying a torque limit to the servo circuit of the injection servo motor with the preset torque limit value for an associated one of the metering stages; and
   (c) driving the injection servo motor in the preset rotating direction.

2. The method of controlling back pressure according to claim 1, wherein said step (a) includes setting the torque limit value for an associated one of the metering stages at a value obtained by subtracting the resistance of the transmission mechanism from the preset back pressure for an associated one of the metering stages.

3. The method of controlling back pressure according to claim 1, wherein the rotating direction of the injection servo motor for each stage is set in a direction to drive the screw in an injection direction when the preset back pressure for an associated one of the metering stages is larger than the resistance of the transmission mechanism, and the rotation direction is set in a direction to drive the screw opposite to the injection direction when the preset back pressure of the corresponding stage is smaller than the resistance of the transmission mechanism.

4. The method of controlling back pressure according to claim 2, wherein the rotating direction of the injection servo motor for each stage is set in a direction to drive the screw in an injection direction when the preset back pressure for an associated one of the metering stages is larger than the resistance of the transmission mechanism, and the rotation direction is set in a direction to drive the screw opposite to the injection direction when the preset back pressure of the corresponding stage is smaller than the resistance of the transmission mechanism.

5. An injection molding machine where a servo motor for rotating a screw and an injection servo motor for driving the screw in an axial direction through a transmission mechanism and performing injection, are driven by servo circuits respectively controlled by a numerical controller for performing a metering operation in a multi-stage fashion, the metering stages starting at corresponding axial positions of the screw and ending at different axial positions of the screw, respectively, one metering stage ending and another adjacent metering stage starting when the screw reaches an associated switching point in its axial position, the transmission mechanism having a plurality of moving elements between which a mechanical energy loss, including a loss resulting from a frictional force generated between the elements, is produced when the transmission mechanism operates, said injection molding machine comprising:
   memory means for storing torque limit values and rotating directions of the injection servo motor and the switching points for the metering stages, each of the torque limit values obtained by subtracting a value representative of the mechanical energy loss from a preset back pressure for an associated one of the metering stages, each of the rotating directions being determined in accordance with a relationship in magnitude between the preset back pressure for an associated one of the metering stages and the value representative of the mechanical energy loss;
   means for detecting the screw position;
   switching means for comparing the detected screw position with each of the stored switching points, and for reading out from said memory means and outputting the torque limit value and the rotating direction for an associated one of the metering stages which is determined by the comparison;
   torque limit means for applying a torque limit to the servo circuit of the injection servo motor, with the torque limit value output from said switching means; and
   means for driving said injection servo motor in the rotating direction output from said switching means.

6. The injection molding machine of claim 5, wherein said rotating drive means includes offset output means for selectively outputting an offset voltage to said servo circuit of the injection servo motor in accordance with the readout rotating direction.

7. The injection molding machine according to claim 5, further comprising means coupled to said memory means for maintaining the screw position of the servo motor at a preset position.

8. The injection molding machine according to claim 5, wherein said memory means stores screw rotation speeds for the metering stages, said switching means reading out the screw rotation speed for a corresponding one of the metering stages from said memory means in accordance with the comparison result, and said screw rotation control means drives the servo motor for rotating the screw at the screw rotation speed read out through said switching means.

9. The injection molding machine according to claim 6, further comprising means coupled to said memory means for maintaining the screw position of the servo motor at a present position.

10. The injection molding machine according to claim 6, wherein said memory means stores screw rotation speeds for the metering stages, said switching means reads out the screw rotation speed for a corresponding one of the metering stages from said memory means in accordance with the comparison result, and said screw rotation control means drives the servo motor for rotating the screw at the screw rotation speed read out through said switching means.

* * * * *

UNITED STATES PATENT AND TRADEMARK OFFICE
CERTIFICATE OF CORRECTION

PATENT NO. : 4,826,640
DATED : MAY 2, 1989
INVENTOR(S) : NORIAKI NEKO

It is certified that error appears in the above-identified patent and that said Letters Patent is hereby corrected as shown below:

FRONT PAGE [57] ABSTRACT line 7, "during" should be --of--;
    line 8, "of" (first occurrence) should be --during--.

Col. 1, line 65, "servo-type" should be --servo motor-type--.

Col. 3, line 48, "voltaage" should be --voltage--.

Col. 4, line 42, "prest" should be --preset--;
    line 48, "of" should be deleted.

Col. 7, line 32, "sevo" should be --servo--.

Signed and Sealed this

Ninth Day of January, 1990

*Attest:*

JEFFREY M. SAMUELS

*Attesting Officer*     *Acting Commissioner of Patents and Trademarks*